United States Patent [19]
Endo et al.

[11] Patent Number: 5,910,585
[45] Date of Patent: Jun. 8, 1999

[54] PROCESS FOR THE PRODUCTION OF COPPER PHTHALOCYANINE

[75] Inventors: Atsushi Endo; Yasumasa Suda, both of Tokyo, Japan

[73] Assignee: Toyo Ink Manufacturing Co., Ltd., Japan

[21] Appl. No.: 09/063,271

[22] Filed: Apr. 21, 1998

[30] Foreign Application Priority Data

May 12, 1997 [JP] Japan ................................. 9-120386

[51] Int. Cl.$^6$ ............................ C09B 67/50; C09B 47/04
[52] U.S. Cl. ........................................... 540/144; 540/122
[58] Field of Search ............................................... 540/144

[56] References Cited

U.S. PATENT DOCUMENTS

| Re. 23,304 | 10/1950 | O'Neal | ................... 260/314.5 |
| 5,602,249 | 2/1997 | Hikosaka | ................... 540/144 |

FOREIGN PATENT DOCUMENTS

| 51-34926 | 3/1976 | Japan . |
| 443107 | 8/1991 | Japan . |

*Primary Examiner*—Richard L. Raymond
*Assistant Examiner*—Pavanaram K. Sripada
*Attorney, Agent, or Firm*—Wenderoth, Lind & Ponack, L.L.P.

[57] ABSTRACT

A process for the production of copper phthalocyanine, which overcomes the defect of a method using two reaction steps that since phthalimide formed in the first step adheres to the wall of a reactor and a stirring blade, the reaction in the second step does not smoothly proceed, so that the yield and the purity of the resultant pigment are low, and which process enables the industrially stable production of highly pure copper phthalocyanine at high yields, the process comprising the steps of (A) reacting phthalic anhydride or a phthalic anhydride derivative with ammonia to form phthalimide, (B) adding part or all of urea to the phthalimide obtained in step (A) and melting the mixture under heat to form a homogeneous slurry, and (C) adding copper or a copper compound and remaining urea if any to the slurry obtained in step (B) and forming a copper phthalocyanine or a copper phthalocyanine derivative in the presence of a catalyst.

6 Claims, No Drawings

PROCESS FOR THE PRODUCTION OF COPPER PHTHALOCYANINE

FIELD OF THE INVENTION

The present invention relates to a process for the production of copper phthalocyanine or a copper phthalocyanine derivative from phthalic anhydride or a phthalic anhydride derivative, ammonia, copper or a copper compound, and urea, which method enables the stable production of a high-purity copper phthalocyanine having a clear color tone.

PRIOR ART OF THE INVENTION

As a conventional method for the production of copper phthalocyanine, there is known a method in which phthalic anhydride, urea and copper or a copper compound are allowed to react under heat in an inert solvent in the presence of a catalyst. For decreasing the amount of urea to be used, JP-A-51-34926 discloses a method in which the reaction is carried out in the following separate two steps. That is, the method comprises a first step of reacting phthalic anhydride or a phthalic anhydride derivative with ammonia and a second step of reacting the resultant reaction mixture with urea and a copper compound in the presence of a catalyst. Further, when ammonia generated in the second step is recycled to the first step to continuously carry out the reaction in the first step, in an industrially advantageous manner, it is made easy to dispose of the generated gas, and the productivity is also improved.

However, the above method has the following problem. Phthalimide formed in the first step adheres to the wall of a reactor and a stirring blade, and therefore, the reaction in the second step does not smoothly proceed, which decreases the yield and the purity of the resultant pigment. In particular, when the first step and the second step are continuously carried out in two separate reactors connected to each other, part of the phthalimide remains in the reactor used in the first step, and it is therefore required to adjust the amount ratio of raw materials to be used in the second step. It is therefore difficult to attain a high yield and a high purity industrially in a stable manner. The above phenomenon particularly dominantly appears when the inert solvent used for the reaction is a hydrocarbon solvent having a relatively low polarity such as paraffin, naphthene, kerosene or alkylbenzene.

SUMMARY OF THE INVENTION

In the method comprising the above two reaction steps, since phthalimide formed in the first step adheres to the wall of a reactor and a stirring blade, the reaction in the second step does not smoothly proceed, so that the yield and the purity of the resultant pigment are low. It is therefore an object of the present invention provide a process for the production of copper phthalocyanine, in which the above defect can be overcome and copper phthalocyanine having a high purity can be industrially stably produced at high yields.

According to the present invention, there is provided a process for the production of copper phthalocyanine or its derivative from phthalic anhydride or a phthalic anhydride derivative, ammonia, copper or a copper compound, and urea, the process comprising the steps of (A) reacting the phthalic anhydride or the phthalic anhydride derivative with ammonia to form phthalimide, (B) adding part or all of the urea to the phthalimide obtained in step (A) and melting the mixture under heat to form a homogeneous slurry, and (C) adding the copper or the copper compound and remaining urea if any to the slurry obtained in step (B) and forming a copper phthalocyanine or a copper pthalocyanine derivative in the presence of a catalyst.

DETAILED DESCRIPTION OF THE INVENTION

In the present invention, the phthalic anhydride or the phthalic anhydride derivative includes a phthalic anhydride or a phthalic anhydride whose benzene ring contains a halogen atom such as chlorine or bromine, an alkyl group such as methyl, ethyl or propyl, a alkoxy group such as methoxy or ethoxy, an aryl group which may have a substituent, a carboxyl group, a sulfone group or a nitro group.

The copper compound can be selected from all the copper salts which are generally used for the synthesis of copper phthalocyanine. The copper compound includes copper halides, copper oxide, copper phosphate, copper nitrate, copper hydroxide, copper acetate and copper sulfate. Of these, copper (I) chloride is the most preferred.

The catalyst can be selected from all of the catalysts which are generally used for the synthesis of copper phthalocyanine. The catalyst includes molybdenum compounds such as ammonium molybdate, molybdic acid, ammonium phosphomolybdate and molybdenum oxide, tungsten compounds such as ammonium tungstate and ammonium phosphotungstate, an arsenical vanadium compound, boric acid, and halide or oxyhalide of titanium, tin or antimony. Of these, ammonium molybdate works excellently.

In the present invention, the ammonia gas may be a mixture of it with an inert gas such as a nitrogen gas. Industrially advantageously, a gas composed mainly of ammonia and a carbon dioxide gas generated in the step (C) can be used as it is.

In the present invention, the reaction may be carried out in the absence of a solvent, while it is industrially advantageous to use an inert solvent such as nitrobenzene, trichlorobenzene, chloronaphthalene, methylnaphthalene, naphthalene, alkylbenzene, paraffin, naphthene or kerosene. The above solvents may be used alone or in combination. When the solvent is used, the solvent may be added in any step of the steps (A) to (C). It is particularly preferred to continuously add the solvent in the step (A), since the adherence of phthalimide to a reactor is decreased in this case.

In the present invention, the reaction temperature in the step (A) is 120 to 230° C., preferably 130 to 180° C. The reaction pressure in the step (A) is 1 to 20 kg/cm$^2$, preferably 2 to 5 kg/cm$^2$. In the step (A), unreacted phthalic anhydride or phthalic acid formed as a byproduct may remain. However, when the amount of the unreacted phthalic anhydride or the phthalic acid is too large, it is difficult to decrease the amount of urea to be used in the steps (B) and (C). Preferably, the amount of remaining phthalic anhydride or phthalic acid is 5 mol % or less based on the charged phthalic anhydride.

In the present invention, the temperature for the melting under heat in the step (B) is 120 to 160° C., preferably 130 to 140° C. When the above temperature is lower than 120° C., no sufficient fluidity can be obtained, and no homogeneous slurry is formed. When the above temperature is higher than 160° C., undesirably, the amount of decomposition product of urea is large, and it is therefore required to add an excess of urea in the step (C).

In the present invention, the reaction temperature in the step (C) is 160 to 230° C., preferably 170 to 200° C. The reaction pressure in the step (C) is 1 to 20 kg/cm$^2$, preferably 2 to 5 kg/cm$^2$.

The amount of the ammonia used in the present invention per mole of the phthalic anhydride or the phthalic anhydride derivative is required to be at least 1 mol, and preferably, it is 1 to 5 mol. The amount of the copper or the copper compound used per mole of the phthalic anhydride or the phthalic anhydride derivative is 0.2 to 0.3 mol, and preferably, it is 0.24 to 0.27 mol. The amount of the urea used per mole of the phthalic anhydride or the phthalic anhydride derivative is 1.5 to 3 mol, preferably 2 to 2.5 mol. The amount of the catalyst is preferably 0.05 to 2% by weight based on the phthalic anhydride or the phthalic anhydride derivative.

The process of the present invention can be carried out by any one of a batch method and a continuous method. When it is carried out by a continuous method, ammonia geneated in the step (C) can be recycled to the step (A), and industrially advantageously, the amount of urea can be decreased.

EXAMPLES

The present invention will be explained with reference to Examples hereinafter, in which "part" and "%" are based on weight unless otherwise specified.

EXAMPLE 1

Two pressure-applicable reactors (reactor 1 and reactor 2) connected to each other through a connection tube were used for continuously carrying out reactions by the following procedures.

148 Parts of phthalic anhydride and 148 parts of t-pentylbenzene were charged into the reactor 1 and melted by heating them to 130° C., and then, 25 to 35 parts of ammonia was introduced over 3 hours. The reaction temperature was maintained at 130 to 180° C., the reaction pressure was maintained at 2 to 3 kg/cm$^2$, and excess ammonia and formed water were discharged through a discharge outlet equipped with a pressure-adjusting valve. After the reaction, it was found that part of formed phthalimide adhered to the wall of the reactor and a stirring blade. The reaction mixture was cooled to 130° C., 138 parts of urea was added, the mixture was stirred at 130° C. for 1 hour, and the reaction mixture was re-charged into the reactor 2 while retaining the above temperature. In this case, almost no substance was found to be adhering to the wall of the reactor 1 and the stirring blade.

148 Parts of phthalic anhydride and 148 parts of t-pentylbenzene were again charged into the reactor 1 and melted under heat. 118.4 Parts of t-pentylbenzene, 24.75 parts of copper (I) chloride and 1 part of ammonium molybdate were charged into the reactor 2 and allowed to react under heat, and generated gas was introduced into the reactor 1. The reaction temperature in the reactor 1 was maintained at 130 to 180° C., and the reaction temperature in the reactor 2 was maintained at 170 to 200° C. The reaction pressure in each reactor was maintained at 2 to 3 kg/cm$^2$, and excess gas and formed water were discharged through the discharge outlet equipped with a pressure-adjusting valve. The reaction time in each reactor was 3 hours.

The reaction mixture in the reactor 2 was withdrawn, and the solvent was distilled off under reduced pressure. Then, 3,000 parts of 2% sulfuric acid was added, and the mixture was heated at 90° C. for 30 minutes and stirred, then followed by filtering, washing with warm water and drying, to give 132 parts of a copper phthalocyanine having a purity of 97%.

After the reaction in the reactor 1, part of formed phthalimide was found to be adhering to the wall of the reactor and the stirring blade. The reaction mixture was cooled to 130° C., 138 parts of urea was added, and the mixture was stirred at 130° C. for 1 hour and then re-charged into the reactor 2 while maintaining the temperature of the reaction mixture. In this case, almost no substance was found to be adhering to the wall of the reactor and the stirring blade.

Then, the above procedure was repeated in the reactor 2 to give 133 parts of a copper phthalocyanine having a purity of 97%.

Comparative Example 1

The same reactors as those in Example 1 were used for carrying out reactions by the following procedures.

148 Parts of phthalic anhydride and 148 parts of t-pentylbenzene were charged into the reactor 1 and melted by heating them to 130° C., and then, 25 to 35 parts of ammonia was introduced over 3 hours. The reaction temperature was maintained at 130 to 180° C., the reaction pressure was maintained at 2 to 3 kg/cm$^2$, and excess ammonia and formed water were discharged through the discharge outlet equipped with a pressure-adjusting valve. After the reaction was completed, the reaction mixture was re-charged into the reactor 2, while part of formed phthalimide was found to be adhering to the wall of the reactor 1 and the stirring blade.

118 Parts of t-pentylbenzene, 138 parts of urea, 24.75 parts of copper (I) chloride and 1 part of ammonium molybdate were charged into the reactor 2. 148 Parts of phthalic anhydride and 148 parts of t-pentylbenzene were again charged into the reactor 1 and melted under heat. The reactor 2 was heated for a reaction, and generated gas was introduced into the reactor 1. The reaction temperature in the reactor 1 was maintained at 130 to 180° C., the reaction temperature in the reactor 2 was maintained at 170 to 200° C., and the reaction pressure in each reactor was maintained at 2 to 3 kg/cm$^2$. Excess gas and formed water were discharged through the discharge outlet equipped with a pressure-adjusting valve. The reaction time in each reactor was 3 hours.

The reaction mixture in the reactor 2 was withdrawn, and the solvent was distilled off under reduced pressure. Then, 3,000 parts of 2% sulfuric acid was added, and the mixture was heated at 90° C., stirred and then followed by filtering, washing with warm water and drying, to give 129 parts of a copper phthalocyanine having a purity of 95%. Both the purity and the yield of the obtained pigment were inferior to those of the pigment obtained in Example 1.

According to the present invention, urea is added to phthalimide formed in the step (A) to form a homogeneous slurry, and the transportation of the phthalimide to the subsequent step is eased, which enables the industrially stable production of highly pure copper phthalocyanine at high yields.

Further, ammonia generated in the step (C) is recycled to the step (A), and the process for the production of copper phthalocyanine is therefore efficient and has a highly economical performance.

What is claimed is:

1. A process for the production of copper phthalocyanine or its derivative from phthalic anhydride or a phthalic anhydride derivative, ammonia, copper or a copper compound, and urea, the process comprising the steps of (A) reacting the phthalic anhydride or the phthalic anhydride derivative with ammonia to form phthalimide, (B) adding part or all of the urea to the phthalimide obtained in step (A) and melting the mixture under heat to form a homogeneous slurry, and (C) adding the copper or the copper compound and remaining urea if any to the slurry obtained in step (B) and forming a copper phthalocyanine or a copper pthalocyanine derivative in the presence of a molylodenum compound as a catalyst.

2. A process according to claim 1, wherein ammonia generated in step (C) is recycled to step (A).

3. A process according to claim 1, wherein step (A) is carried out in the presence of a solvent inert to the reaction which is nitrobenzene, trichlorobenzene, chloronaphthalene, methylnaphthalene, naphthalene, alkylbenzene, paraffin, naphthene or kerosene.

4. A process according to claim 1, wherein the ammonia is used in an amount of 1 to 5 mol per mole of the phthalic anhydride or the phthalic anhydride derivative.

5. A process according to claim 1, wherein the copper or the copper compound is used in an amount of 0.2 to 0.3 mol per mole of the phthalic anhydride or the phthalic anhydride derivative.

6. A process according to claim 1, wherein the catalyst is used in an amount of 0.05 to 2% by weight based on the phthalic anhydride or the phthalic anhydride derivative.

* * * * *

UNITED STATES PATENT AND TRADEMARK OFFICE
CERTIFICATE OF CORRECTION

PATENT NO. :   5,910,585
DATED      :   June 8, 1999
INVENTOR(S) :  Atsushi ENDO et al.

It is certified that error appears in the above-identified patent and that said Letters Patent is hereby corrected as shown below:

Claim 1, lines 1 and 2 from the bottom, change "molylodenum" to --molybdenum--.

Signed and Sealed this

Twenty-fourth Day of October, 2000

Attest:

Q. TODD DICKINSON

Attesting Officer

Director of Patents and Trademarks